United States Patent
Takimoto et al.

(10) Patent No.: US 11,205,453 B2
(45) Date of Patent: Dec. 21, 2021

(54) HARD DISK SUBSTRATE AND HARD DISK DEVICE INCLUDING THE HARD DISK SUBSTRATE

(71) Applicant: Toyo Kohan Co., Ltd., Tokyo (JP)

(72) Inventors: Ayaka Takimoto, Kudamatsu (JP); Nobuaki Mukai, Kudamatsu (JP)

(73) Assignee: Toyo Kohan Co., Ltd., Tokyo (JP)

( * ) Notice: Subject to any disclaimer, the term of this patent is extended or adjusted under 35 U.S.C. 154(b) by 103 days.

(21) Appl. No.: 16/473,662

(22) PCT Filed: Dec. 28, 2017

(86) PCT No.: PCT/JP2017/047169
§ 371 (c)(1),
(2) Date: Jun. 26, 2019

(87) PCT Pub. No.: WO2018/124262
PCT Pub. Date: Jul. 5, 2018

(65) Prior Publication Data
US 2019/0333535 A1   Oct. 31, 2019

(30) Foreign Application Priority Data
Dec. 28, 2016   (JP) .............................. JP2016-256994

(51) Int. Cl.
*G11B 5/73* (2006.01)
(52) U.S. Cl.
CPC ........ *G11B 5/73913* (2019.05); *G11B 5/7371* (2019.05); *G11B 5/7377* (2019.05); *G11B 5/73919* (2019.05)

(58) Field of Classification Search
None
See application file for complete search history.

(56) References Cited

U.S. PATENT DOCUMENTS

| 4,826,737 A | * | 5/1989 | Yamada | .................. C22C 21/06 |
| | | | | 148/522 |
| 5,759,681 A | | 6/1998 | Hosoe et al. | |

(Continued)

FOREIGN PATENT DOCUMENTS

| CN | 1136693 | 11/1996 |
| GB | 2528386 | 1/2016 |

(Continued)

OTHER PUBLICATIONS

Machine Translation of JP H09198640 A (Year: 1997).*

(Continued)

*Primary Examiner* — Kevin M Bernatz
(74) *Attorney, Agent, or Firm* — McCarter & English, LLP (57) ABSTRACT

Provided are a thin hard disk substrate that is scratch-resistant on the disk surface and wobbles less during rotation and a hard disk device including such a hard disk substrate. The hard disk substrate 1 includes an aluminum alloy substrate 2 having NiP plating films 3 on the surfaces. The aluminum alloy substrate 2 has the Vickers hardness of 60 Hv or more, the ratio between the thickness of the NiP plating films 3 and the thickness of the Al alloy substrate 2 is 3.8% or more, the Young's modulus of the hard disk substrate 1 is 74.6 GPa or more, and the Vickers hardness of the hard disk substrate 1 is 293 Hv or more.

2 Claims, 4 Drawing Sheets

(56) References Cited

U.S. PATENT DOCUMENTS

| | | | |
|---|---|---|---|
| 9,875,765 B2* | 1/2018 | Yukimatsu | G11B 5/7315 |
| 10,593,359 B2* | 3/2020 | Murase | G11B 5/858 |
| 2007/0202312 A1 | 8/2007 | Kim et al. | |
| 2011/0086241 A1 | 4/2011 | Hachitani et al. | |
| 2013/0231236 A1 | 9/2013 | Kawai et al. | |
| 2017/0327930 A1 | 11/2017 | Kitawaki et al. | |
| 2018/0226095 A1* | 8/2018 | Murase | G11B 25/043 |
| 2020/0035268 A1* | 1/2020 | Osakabe | G11B 5/73915 |

FOREIGN PATENT DOCUMENTS

| | | |
|---|---|---|
| JP | H087251 | 1/1996 |
| JP | H09198640 | 7/1997 |
| JP | H10334445 | 12/1998 |
| JP | 2006-241513 | 9/2006 |
| JP | 2012-195021 | 10/2012 |
| TW | 2010-04885 | 2/2010 |
| TW | 2016-10125 | 3/2016 |
| WO | 2012/001914 | 1/2012 |
| WO | 2016/068293 | 5/2016 |

OTHER PUBLICATIONS

Machine Translation of JP H10334445 A (Year: 1998).*
Machine Translation of JP H087251 A (Year: 1996).*
Machine Translation of JP 10-334445 A (Year: 1998).*
Machine Translation of JP 2006-241513 A (Year: 2006).*
Chinese Office Action based on co-pending Chinese Application No. 201780081695.2, dated Jun. 2, 2020—2 Pages.
International Search Report based on co-pending PCT Application No. PCT/JP2017/047169, dated Mar. 6, 2018—1 Page.

* cited by examiner

HARD DISK SUBSTRATE AND HARD DISK DEVICE INCLUDING THE HARD DISK SUBSTRATE

CROSS-REFERENCE TO RELATED APPLICATIONS

This application is a national stage application filed under 35 USC 371 of PCT/JP2017/047169, filed Dec. 28, 2017, which claims the benefit of Japanese Patent Application No. 2016-256994, filed Dec. 28, 2016, each of which is incorporated herein, in its entirety, by reference.

TECHNICAL FIELD

The present invention relates to a hard disk substrate and a hard disk device including the hard disk substrate.

BACKGROUND ART

For a higher-capacity and more compact hard disk device, thinner hard disk substrates have been developed. Such a thinner hard disk substrate allows the number of hard disks loaded in the hard disk device to increase and so increases the capacity of the hard disk device.

Patent Literature 1, for example, describes a magnetic recording disk including an Al alloy substrate of 1.89 inch in outer diameter. The thickness of the substrate is 0.635 mm, and a NiP plating layer on the substrate has a thickness of 7 m or more. Patent Literature 2 describes a magnetic disk with improved impact resistance. To this end, the disk includes a surface treated film with the Vickers hardness of a predetermined value or more.

CITATION LIST

Patent Literatures

Patent Literature 1: JP H8-7251 A
Patent Literature 2: JP H9-198640 A

SUMMARY OF INVENTION

Technical Problem

A thinner Al alloy substrate, however, may cause wobbling (fluttering) of the hard disk when the hard disk rotates in the hard disk device.

A thinner Al alloy substrate causes another problem of a decrease in bearing strength of the hard disk substrate as well as a decrease in hardness. If such a hard disk comes in contact with a magnetic head, for example, in the hard disk device due to drop impact, fluttering or the like, the surface of the hard disk easily has scratches.

In view of the above problems, the present invention aims to provide a thin hard disk substrate that is scratch-resistant on the disk surface and wobbles less during rotation, and to provide a hard disk device including such a hard disk substrate.

Solution to Problem

To solve the above problems, a hard disk substrate of the present invention is a hard disk substrate including an aluminum alloy substrate having NiP plating films on the surfaces.

The aluminum alloy substrate has a Vickers hardness of 60 Hv or more, a ratio between a plating thickness of the NiP plating films and a thickness of the Al alloy substrate is 3.8% or more, a Young's modulus of the hard disk substrate is 74.6 GPa or more, and a Vickers hardness of the hard disk substrate is 293 Hv or more.

A hard disk substrate of the present invention has the following features.

The aluminum alloy substrate has a thickness of 0.338 mm or more and 0.635 mm or less, and the sum of the plating thicknesses of the NiP plating films on both faces is 22 μm or more and 60 μm or less.

The present invention covers a hard disk device including such a hard disk substrate as well.

Advantageous Effects of Invention

A hard disk substrate according to the present invention during use in a hard disk device reduces scratches on the surface of the hard disk and reduces the amplitude due to fluttering during the rotation of the hard disk.

Further features of the present invention will be clear from the following descriptions and the attached drawings. Other problems, configurations and advantageous effects also will be clear from the following descriptions of the embodiment.

DESCRIPTION OF EMBODIMENTS

The following describes one embodiment of the present invention.

Figure 1:
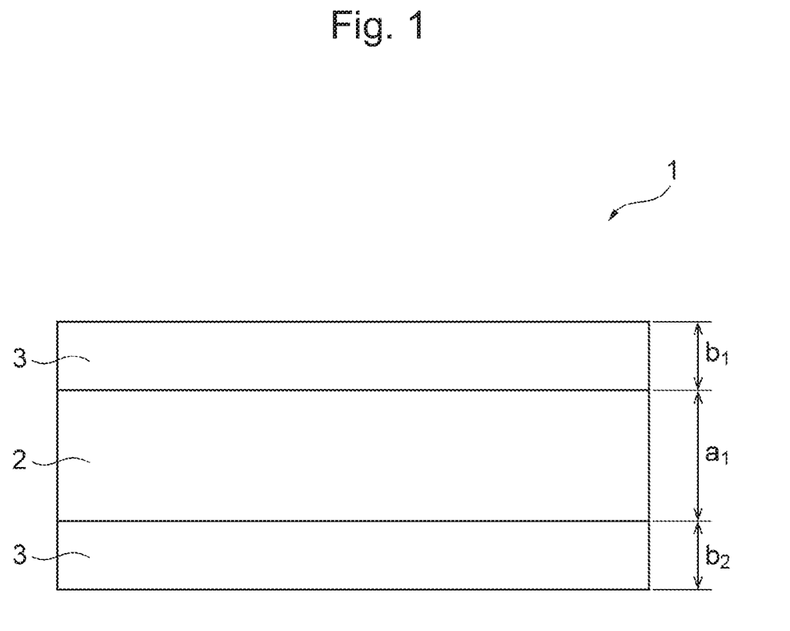
FIG. 1 is a schematic cross-sectional view of a hard disk substrate.

FIG. 1 is a schematic cross-sectional view of a hard disk substrate.

A hard disk substrate 1 includes an aluminum alloy substrate (hereinafter called Al alloy substrate) 2 having a NiP plating film 3 on a surface. The NiP plating film 3 is a non-magnetic surface treated film. The NiP plating films 3 are formed on both faces of the Al alloy substrate 2. A hard disk includes a magnetic film formed on the surface of the hard disk substrate 1. A hard disk device includes a plurality of such hard disks as well as a motor and a magnetic head.

The hard disk substrate of the present embodiment is a high-capacity hard disk substrate, and is a substrate for magnetic disk that is impact-resistant and generates less fluttering.

Thinner hard disk substrates have been available recently, and the number of hard disks loaded in a hard disk device accordingly increases due to such a thinner substrate. Particularly hard disks for nearline applications have a high recording capacity. The proximity between the surface of a hard disk and a slider surface of a magnetic head also increases, and this also enables a higher recording capacity.

Thinner hard disks, however, may cause fluttering of the hard disks during rotation in the hard disk device, i.e., the hard disks may wobble. Especially such fluttering is appreciable when the thickness of the hard disk substrate is 0.635 mm or less.

The following Equation (1) represents the fluttering of hard disks:

$$W = F \cdot a^2 \cdot (1-v^2)/(E \cdot \beta \cdot h^3 \cdot \lambda^4) \qquad (1)$$

where W denotes the amplitude of a hard disk, F denotes the number of revolutions of the substrate, a denotes the outer radius of the substrate, v denotes the Poisson ratio, E denotes the Young's modulus, β denotes the damping factor of the substrate, h denotes the thickness of the substrate, and λ denotes the shape parameter of the substrate.

Excessive fluttering of hard disks increases the frequency of collisions of the hard disks with the magnetic head facing the hard disks or other parts in proximity to the hard disks. The collision may break the protective films or the magnetic films of hard disks, and so degrade the data reliability. Hard disk substrates therefore have to have improved Young's modulus, decreased fluttering (amplitude of the substrates) and have to have improved bearing strength and hardness to increase the strength against collisions with a magnetic head and other parts in proximity to the disks.

A hard disk substrate 1 of the present invention has the Vickers hardness of 60 Hv or more of the Al alloy substrate 2, the ratio between the plating thickness of the NiP plating films 3 and the thickness of the Al alloy substrate 2 that is 3.8% or more, the Young's modulus of the hard disk substrate 1 that is 74.6 GPa or more, and the Vickers hardness of the hard disk substrate 1 that is 293 Hv or more.

The plating thickness ratio is the ratio between the plating thickness (b1+b2) of the NiP plating films 3 and the thickness (a1) of the Al alloy substrate 2 (plating thickness/aluminum thickness (%)), and is calculated by the following Equation (2):

$$((b1+b2) \div (a1)) \times 100(\%) \qquad (2).$$

The present embodiment refers to the sum of the plating thicknesses of the NiP plating films 3 on both faces of the hard disk substrate 1 as "plating thickness of the NiP plating films 3" and refers to the plating thickness of the NiP plating film 3 on one of the faces of the hard disk substrate 1 as "one-side plating thickness of the NiP plating film 3".

Preferably the Al alloy substrate 2 of the hard disk substrate 1 has a thickness of 0.338 mm or more and 0.635 mm or less, and the plating thickness of the NiP plating films 3 is 22 µm or more and 60 µm or less. Preferably the plating thickness of the NiP plating films 3 is 22 µm or more and 40 µm or less. In one example, when the thickness of the Al alloy substrate 2 is 0.617 mm, the plating thickness of the NiP plating films preferably is 22 µm or more.

A method for manufacturing the hard disk substrate of the present embodiment includes: a substrate forming step of forming a substrate by grinding an Al alloy substrate; a plating step of applying electroless NiP plating to the substrate to form electroless NiP plating films on the surfaces of the substrate; a polishing step of polishing each surface of the substrate having the electroless NiP films; and a washing step of washing the polished plating films.

Among these steps, the plating step includes (1) degreasing, (2) water washing, (3) etching, (4) water washing, (5) desmutting, (6) water washing, (7) first zincate treatment, (8) water washing, (9) de-zincate treatment, (10) water washing, (11) second zincate treatment, (12) water washing, (13) electroless NiP plating, (14) water washing, (15) drying, and (16) annealing.

The plating solution used in (13) electroless Ni plating preferably has a large deposition rate and good corrosion resistance. In one example, the deposition rate is preferably 6.0 µm/h or more. The NiP plating film preferably has the corrosion resistance such that when the created NiP plating film is immersed in nitric acid of 30% in concentration at 40° C. for 7 minutes, the corrosion area is 1.3% or less.

During manufacturing of a hard disk substrate, a thinner Al alloy substrate of 0.635 mm or less in thickness has to have thicker NiP plating films 3 formed on the faces than in the case of a thicker Al alloy substrate, e.g., 0.8 mm in thickness. Conventional plating solution having a small deposition rate therefore is not favorable because the productivity deteriorates to form such a thick plating film.

Although the hard disk substrate of the present embodiment includes a thinner Al alloy substrate of 0.635 mm or less in thickness, the method uses electroless NiP plating solution having a large deposition rate as stated above. The present embodiment therefore does not interfere with the productivity. Plating with the plating solution having a large deposition rate may degrade the corrosion resistance. The NiP plating film of the present embodiment is corrosion-resistant, and so keeps the corrosion resistance. The method therefore enables efficient manufacturing of a hard disk substrate that reduces scratches on the surface of the hard disk during use in a hard disk device and reduces the amplitude due to fluttering during the rotation of the hard disk.

The hard disk substrate 1 as stated above reduces fluttering (amplitude of the substrate), and improves the bearing force and the strength against collisions with a magnetic head and other parts in proximity to the disk.

Examples

<Manufacturing of Substrate>

Al alloy substrates (5086 aluminum alloy of 5000 series, specified by JIS H4000) having the Vickers hardness of 60 Hv or more and the thickness of 0.617 mm were prepared, and then amorphous NiP plating was applied by electroless NiP plating to the surfaces of these Al alloy substrates to form plating films having various thicknesses.

Two types of the Al alloy substrates were used, having the thickness of 0.617 mm, and the Vickers hardness of 60 Hv and 75 Hv. Double zincate treatment was performed as a pretreatment of the plating. Specifically (i) degreasing was performed at 50° C. for 2 minutes using a well-known degreasing solution containing sodium phosphate and surfactant, (ii) etching was performed at 50° C. for 2 minutes using a well-known etchant containing sulfuric acid and phosphoric acid, (iii) de-smutting was performed at 20° C. for 30 seconds using a well-known de-smutting solution containing nitric acid, (iv) first zincate treatment was performed at 20° C. for 30 seconds using a well-known alkali zincate treatment solution containing sodium hydroxide, zinc, iron, and a complexing agent therefor, (v) de-zincate treatment was performed at 20° C. for 30 seconds using a solution similar to the de-smutting solution, and (vi) second zincate treatment was performed at 20° C. for 30 seconds using a solution similar to that for the first zincate treatment. Between these steps of (i) to (vi), water washing was performed. Subsequently electroless nickel plating was performed using a well-known malate-succinate electroless nickel plating solution for the time duration to have an intended film thickness.

[Evaluation 1: Vickers Hardness]

To find the Vickers hardness of the prepared plated substrates, measurement was performed using a Vickers hardness meter (produced by Akashi Seisakusyo, Ltd. Micro-Vickers hardness tester MVK-G2) under the load of 100 g. The measurement was performed in accordance with JISZ2244. The measurement was performed while checking the accuracy with a high-accuracy standardized block of hardness (produced by Yamamoto Scientific Tool Laboratory, HMV200).

Figure 2:
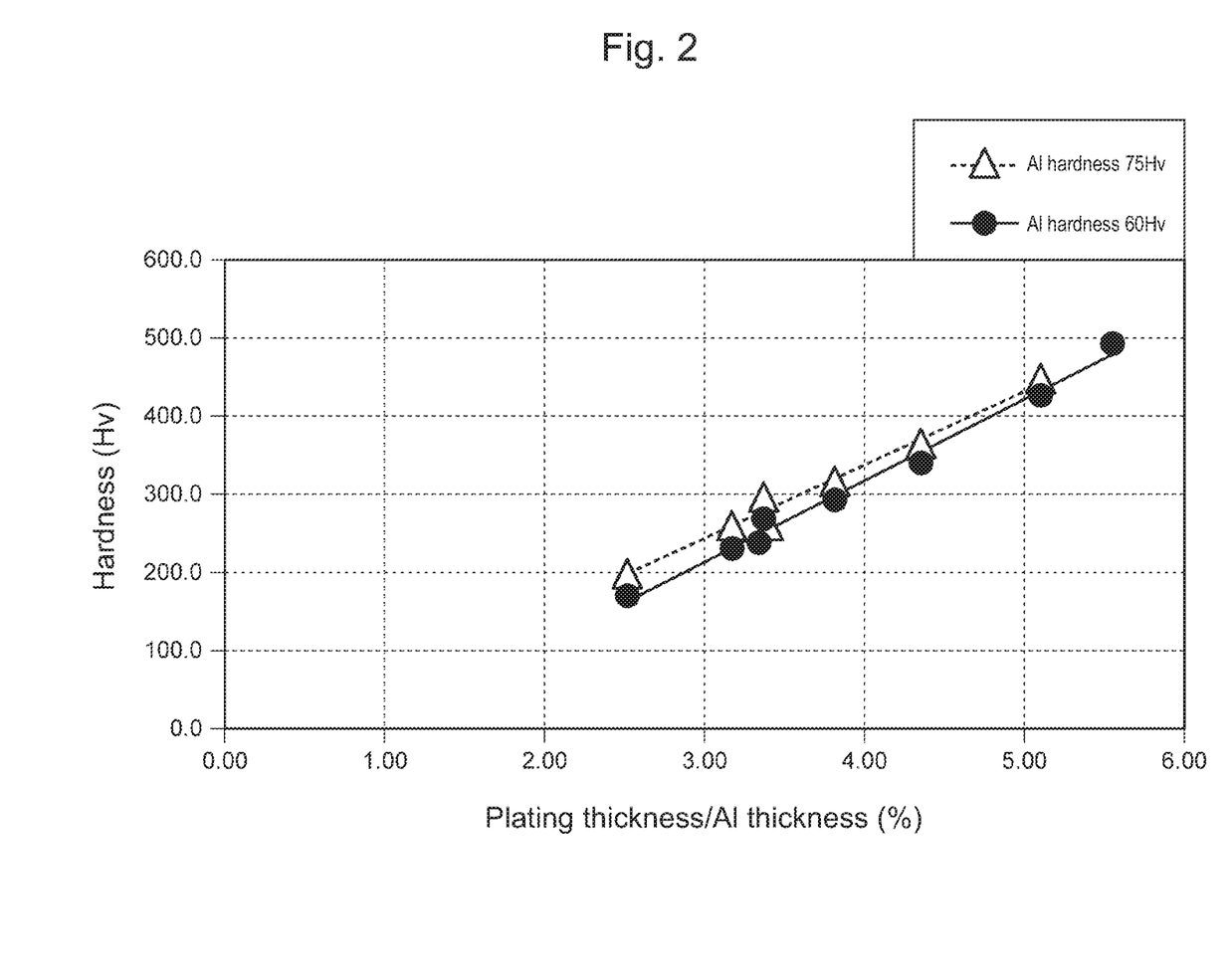
FIG. 2 is a graph showing the relationship between the plating thickness/substrate thickness ratio and the Vickers hardness.

Table 1 shows the measurement results of the ratio (plating-thickness ratio) between the thickness of the NiP plating films and the thickness of the Al alloy substrate and the Vickers hardness of the hard disk substrate 1 for the Al alloy substrate having the Vickers hardness of 60 Hv. Table 2 shows the measurement results of the ratio (plating-thickness ratio) between the thickness of the NiP plating films and the thickness of the Al alloy substrate and the Vickers hardness of the hard disk substrate 1 for the Al alloy substrate having the Vickers hardness of 75 Hv. FIG. 2 is a graph showing the measurement results of Table 1 and Table 2.

In Table 1 and Table 2, the one-side plating thickness refers to the thickness (b1 or b2) of the NiP plating film on one of the faces of the Al alloy substrate 2. Basically the plating films on one face and on the other face of the Al alloy substrate had the same thickness. That is, twice the one-side plating thickness equals the plating thickness.

TABLE 1

Al hardness 60 Hv

|  | Al thickness (mm) | One-side plating thickness (μm) | Plating thickness ratio (Plating thickness/ Al (%)) | Vickers hardness load 100 g |
|---|---|---|---|---|
| Comp. Ex. 1 | 0.617 | 7.77 | 2.52 | 170.3 |
| Comp. Ex. 2 | 1.731 | 9.06 | 1.05 | 203.3 |
| Comp. Ex. 3 | 0.617 | 9.79 | 3.17 | 230.7 |
| Comp. Ex. 4 |  | 10.31 | 3.34 | 238.3 |
| Comp. Ex. 5 |  | 10.4 | 3.37 | 268.8 |
| Ex. 1 |  | 11.77 | 3.82 | 293.0 |
| Ex. 2 |  | 13.43 | 4.35 | 340.3 |
| Ex. 3 |  | 15.74 | 5.10 | 426.3 |
| Ex. 4 |  | 17.13 | 5.55 | 493.0 |

TABLE 2

Al hardness 75 Hv

|  | Al thickness (mm) | One-side plating thickness (μm) | Plating thickness ratio (Plating thickness/ Al (%)) | Vickers hardness load 100 g |
|---|---|---|---|---|
| Comp. Ex. 6 | 0.617 | 7.77 | 2.52 | 198.0 |
| Comp. Ex. 7 | 1.731 | 9.08 | 1.05 | 246.3 |
| Comp. Ex. 8 | 0.617 | 9.785 | 3.17 | 259.7 |
| Comp. Ex. 9 |  | 10.4 | 3.37 | 296.3 |
| Comp. Ex. 10 |  | 10.49 | 3.40 | 259.7 |
| Ex. 5 |  | 11.77 | 3.82 | 316.7 |
| Ex. 6 |  | 13.43 | 4.35 | 364.7 |
| Ex. 7 |  | 15.74 | 5.10 | 447.7 |

The ratio between plating thickness/aluminum thickness (plating thickness ratio) and the Vickers hardness have the relationship as in the following Equations (3) and (4):

When the Al alloy substrate has the Vickers hardness of 60 Hv and the thickness of 0.617 mm, $$y=103.79x-97.55 \quad (3).$$

When the Al alloy substrate has the Vickers hardness of 75 Hv and the thickness of 0.617 mm, $$y=95.307x-44.248 \quad (4).$$

(Impact Resistance Test and the Evaluation Method)

Impact resistance test was performed for Examples 1 to 4 and Comparative Examples 3, 4 and 5 as stated above. This impact resistance test was performed by attaching a scratch gauge (produced by Trusco, KB-PK) to an impact tester produced by Du pont, pinching a disk substrate between an impact punch and a base, and then falling a weight to form a dent on the disk substrate. The depth of the dent was measured by 3D measurement using a digital microscope (produced by Hirox Co., Ltd. KH-8700).

The following describes the method of calculating the impact value.

Weight M: 11.9784 g
Height to fall weight h: 0.05 m
Impact punch m: 13.0840 g
Assuming that the time before stopping is 0.001 s, the impact value "G"=$(M/(M+m))\times\sqrt{2gh}$-the speed at stopping)÷the time before stopping $(s)$=475.2 m/s$^2$=48.5 G (Evaluation Criteria)

The depth of the dent was measured at 10 different points, and the average of the measurements was calculated. When the average was larger than 120 μm, the impact resistance was evaluated as NG or failed, and when the average was 120 μm or less, the impact resistance was OK or passed.

(Evaluation Results)

The results of the test show that Examples 1, 2, 3 and 4 were passed, and so were evaluated as OK for impact resistance. Comparative Examples 3, 4 and 5 were failed, and so were evaluated as NG for impact resistance.

As shown in Table 1 and FIG. 2, a larger plating thickness ratio leads to an improved Vickers hardness. Examples 1 to 4 having the plating thickness ratio of 3.82% or more were strong materials having the Vickers hardness exceeding 293.0 Hv.

[Evaluation 2: Young's Modulus]

To find the Young's modulus of the prepared plated substrate having the Vickers hardness of 60 Hv, the measurement was performed using a Young's modulus tester (produced by Nihon Techno-Plus Co. Ltd. JE-RT). The measurement was performed by the free resonance method at room temperatures and in the air atmosphere.

The substrate was cut to have the width of 10 mm and the length of 60 mm, and was suspended by a metal thin wire at the position of vibration node to generate resonance at the free end. The Young's modulus E was calculated by Equation (5).

$$E = 0.9465\frac{mf_E^2}{w}\left(\frac{L}{t}\right)^3 \quad (5)$$

where E denotes the Young's modulus, $f_E$ denotes the bending resonance frequency, m denotes the mass, L denotes the length of the substrate, w denotes the width of the substrate, and t denotes the thickness of the substrate.

Figure 3:
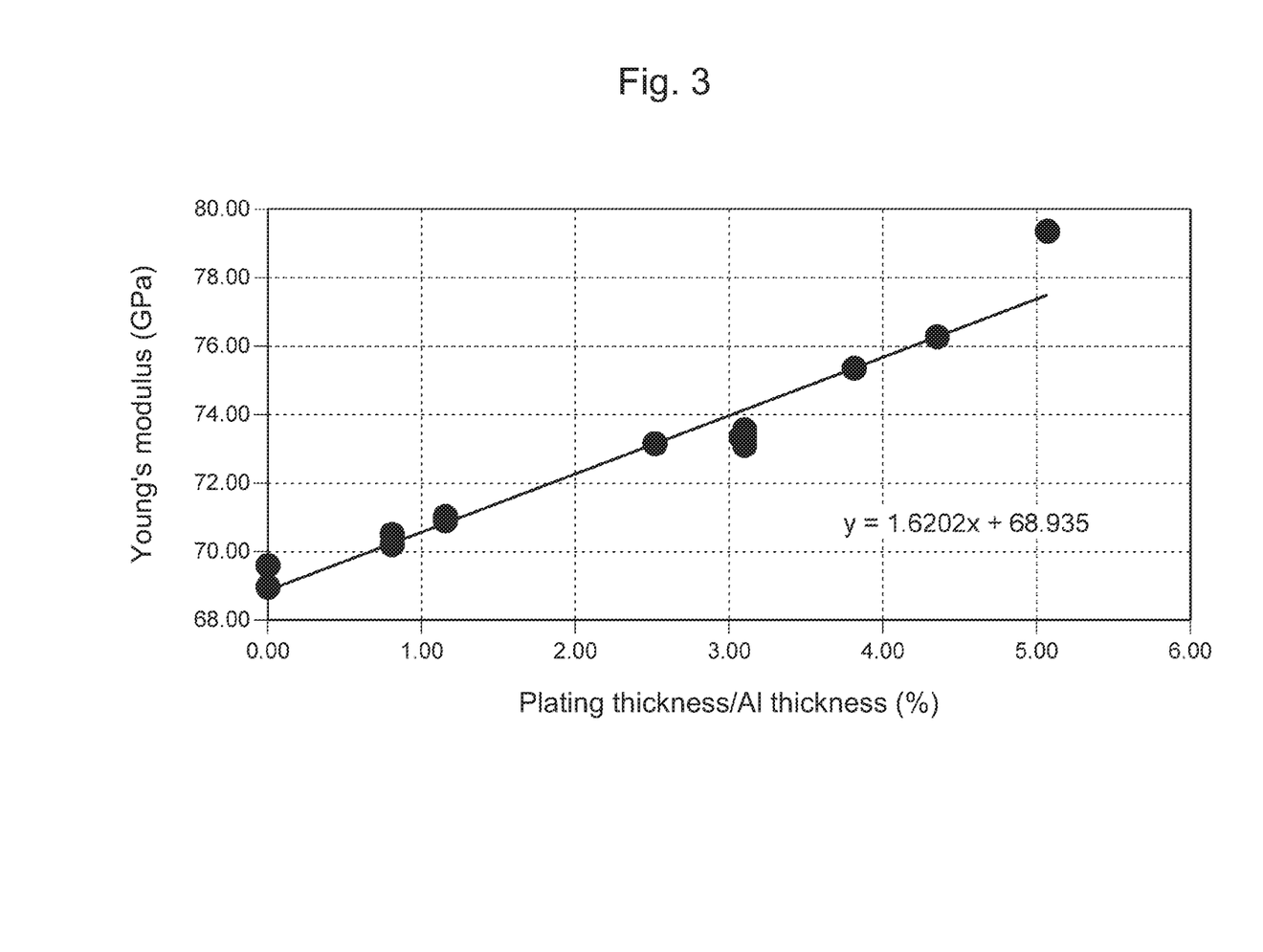
FIG. 3 is a graph showing the relationship between the plating thickness/substrate thickness ratio and the Young's modulus.

Table 3 shows the measurement results of the ratio (plating-thickness ratio) between the thickness of the NiP plating films and the thickness of the Al alloy substrate and the Young's modulus of the hard disk substrate 1 for the Al alloy substrate having the Vickers hardness of 60 Hv. FIG. 3 is a graph of the measurement result of Table 3.

TABLE 3

Al hardness 60 Hv

|  | Al thickness (mm) | One-side plating thickness (μm) | Plating thickness ratio (Plating thickness/ Al (%)) | Young's modulus |
|---|---|---|---|---|
| Comp. Ex. 11 | 1.731 | 0 | 0.00 | 68.97 |
| Comp. Ex. 12 |  | 0 | 0.00 | 69.60 |
| Comp. Ex. 13 |  | 7 | 0.81 | 70.50 |
| Comp. Ex. 14 |  | 7 | 0.81 | 70.20 |
| Comp. Ex. 15 |  | 10 | 1.16 | 70.90 |
| Comp. Ex. 16 |  | 10 | 1.16 | 71.03 |
| Comp. Ex. 17 | 0.617 | 9.56 | 3.10 | 73.35 |
| Comp. Ex. 18 |  | 9.56 | 3.10 | 73.55 |
| Comp. Ex. 19 |  | 9.56 | 3.10 | 73.10 |
| Comp. Ex. 20 |  | 9.50 | 3.08 | 73.35 |
| Comp. Ex. 21 |  | 7.77 | 2.52 | 73.15 |
| Comp. Ex. 22 |  | 7.77 | 2.52 | 72.9 |
| Ex. 8 |  | 11.77 | 3.82 | 75.36 |
| Ex. 9 |  | 13.43 | 4.35 | 76.27 |
| Ex. 10 |  | 15.29 | 5.07 | 79.35 |
| Ex. 11 |  | 11.77 | 3.82 | 74.6 |
| Ex. 12 |  | 13.43 | 4.35 | 75 |

The ratio between plating thickness/aluminum thickness (plating thickness ratio) and the Young's modulus of Comparative Examples 11 to 20 have the relationship as in the following Equation (6):

$$y=1.6202x+68.935 \qquad (6).$$

As shown in Table 3 and FIG. 3, a larger plating thickness ratio leads to an improved Young's modulus. Examples 8 to 12 having the plating thickness ratio of 3.82% or more had the Young's modulus exceeding 74.6 GPa, and had remarkably improved performance to reduce fluttering.

Figure 4:
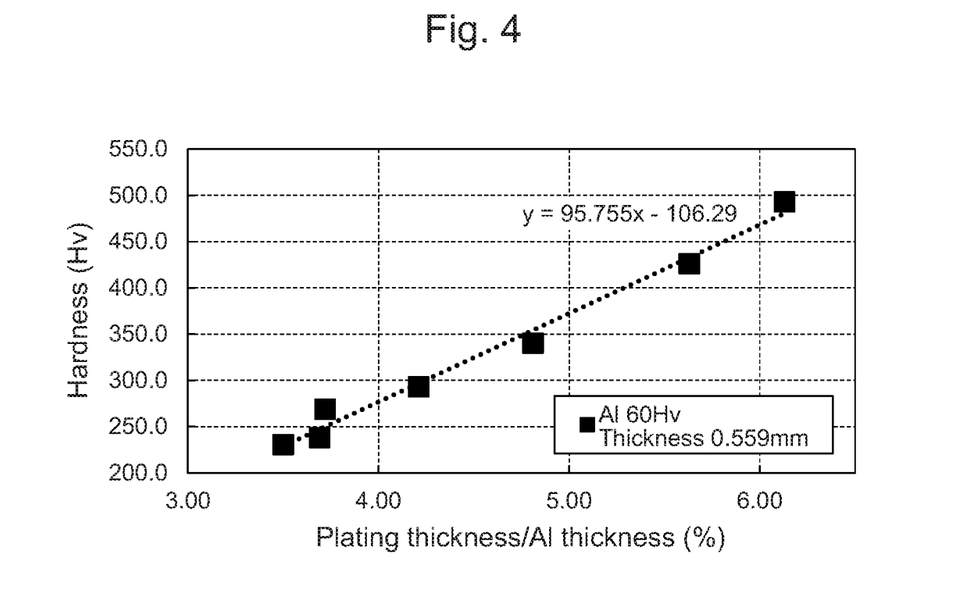
FIG. 4 is a graph showing the relationship between the plating thickness/substrate thickness ratio and the Vickers hardness.
Figure 5:
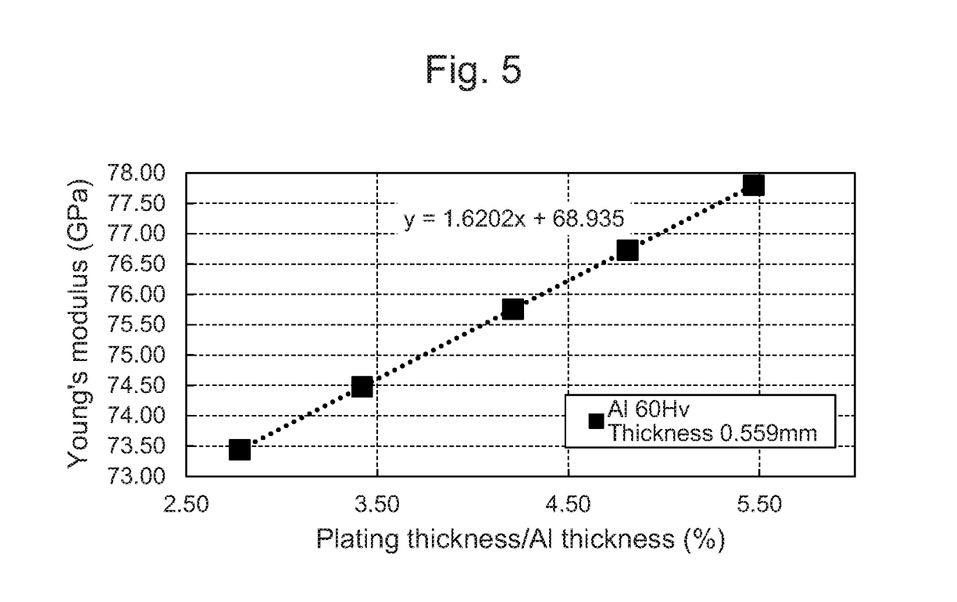
FIG. 5 is a graph showing the relationship between the plating thickness/substrate thickness ratio and the Young's modulus.

Table 4 and Table 5 show the values (reference values) of the Vickers hardness and the Young's modulus, respectively, of the hard disk substrate 1 including the Al alloy substrate of 0.559 mm in thickness and having the Vickers hardness of 60 Hv. These values were calculated by assigning the plating thickness ratio of the Al alloy substrate of 0.559 mm in thickness to x in Equation (6), which was created based on the measurement results of the Al alloy substrate of 0.617 mm in thickness. FIG. 4 and FIG. 5 are graphs of the reference values of Table 4 and Table 5. The reference values shown in Table 4 and Table 5 were calculated based on Examples 1 to 12 and Comparative Examples 1 to 22 shown in Tables 1 to 3.

TABLE 4

Al hardness 60 Hv

|  | Al thickness (mm) | One-side plating thickness (μm) | Plating thickness ratio (Plating thickness/ Al (%)) | Vickers hardness load 100 g (Predicted values) |
|---|---|---|---|---|
| Ref. value 1 | 0.559 | 9.785 | 3.50 | 230.7 |
| Ref. value 2 |  | 10.31 | 3.69 | 238.3 |
| Ref. value 3 |  | 10.4 | 3.72 | 268.8 |
| Ref. value 4 |  | 11.77 | 4.21 | 293.0 |
| Ref. value 5 |  | 13.43 | 4.81 | 340.3 |
| Ref. value 6 |  | 15.74 | 5.63 | 426.3 |
| Ref. value 7 |  | 17.13 | 6.13 | 493.0 |

TABLE 5

Al hardness 60 Hv

|  | Al thickness (mm) | One-side plating thickness (μm) | Plating thickness ratio (Plating thickness/ Al (%)) | Young's modulus (Predicted values) |
|---|---|---|---|---|
| Ref. value 8 | 0.559 | 7.77 | 2.78 | 73.44 |
| Ref. value 9 |  | 9.56 | 3.42 | 74.48 |
| Ref. value 10 |  | 11.77 | 4.21 | 75.76 |
| Ref. value 11 |  | 13.43 | 4.81 | 76.73 |
| Ref. value 12 |  | 15.29 | 5.47 | 77.80 |

The plating thickness ratio and the Vickers hardness (reference values) have the relationship as in the following Equation (7):

$$y=95.755x-106.29 \qquad (7).$$

The plating thickness ratio and the Young's modulus (reference values) have the relationship as in the following Equation (8):

$$y=1.6202x-68.935 \qquad (8).$$

The hard disk substrates 1 shown in Table 4 and Table 5 included the Al alloy substrates that were thinner than those in Examples 1 to 12. These hard disk substrates therefore preferably have a one-side plating thickness larger than those of Examples 1 to 12. The reference values 4 to 7 of the Vickers hardness exceeds 293.0 Hv that have a good effect of reducing fluttering, and the reference values 10 to 12 of the Young's modulus exceeds 75.76 GPa and are strong materials.

Table 6 shows the measurement result of the Vickers hardness of the hard disk substrate 1 including the Al alloy substrate of 0.559 mm in thickness and having the Vickers hardness of 60 Hv.

TABLE 6

Al hardness 60 Hv

|  | Al thickness (mm) | One-side plating thickness (μm) | Plating thickness ratio (Plating thickness/ Al (%)) | Vickers hardness load 100 g |
|---|---|---|---|---|
| Ex. 13 | 0.559 | 30 | 10.73 | 616.0 |

The hard disk substrate 1 of Example 13 shown in Table 6 had the one-side plating thickness of the Al alloy substrate that was 30 μm and had the plating thickness ratio of 10.73. The hard disk substrate 1 of Example 13 was a strong material having the measurement result of the Vickers hardness that was 616.0 Hv, and so has a better effect of reducing scratches than in Comparative Examples.

Table 7 shows the measurement result of the Young's modulus of the hard disk substrate 1 including the Al alloy substrate of 0.559 mm in thickness and having the Vickers hardness of 60 Hv.

TABLE 7

| | Al hardness 60 Hv | | | |
|---|---|---|---|---|
| | Al thickness (mm) | One-side plating thickness (μm) | Plating thickness ratio (Plating thickness/ Al (%)) | Young's modulus |
| Ex. 14 | 0.559 | 30 | 10.73 | 81.3 |

Similarly to Example 13, the hard disk substrate 1 of Example 14 shown in Table 7 had the one-side plating thickness of the Al alloy substrate that was 30 μm and had the plating thickness ratio of 10.73. The hard disk substrate 1 of Example 14 showed the measurement result of the Young's modulus of 81.3 GPa to have a good effect of suppressing fluttering, and remarkably reduced fluttering as compared with Comparative Examples.

That is the detailed description of one embodiment of the present invention. Note here that the present invention is not limited to the above-described embodiment, and may be modified variously in design without departing from the spirit of the present invention recited in claims.

REFERENCE SIGNS LIST

1 Hard disk substrate
2 Aluminum alloy substrate (Al alloy substrate)
3 NiP plating film
a1 Thickness of aluminum alloy substrate
b1, b2 Thickness of NiP plating film

The invention claimed is:

1. A hard disk substrate comprising an aluminum alloy substrate having NiP plating films on the surfaces,
    the aluminum alloy substrate having a thickness of in a range of 0.338 mm to 0.617 mm, a Vickers hardness of 60 Hv or more, a ratio between a thickness of the NiP plating films and a thickness of the Al alloy substrate being 3.8% or more, a Young's modulus of the hard disk substrate being 74.6 GPa or more, a Vickers hardness of the hard disk substrate having a range of 293 Hv to 616 Hv, and a plating thickness of the NiP plating films in a range of 23.54 μm to 60 μm.

2. A hard disk device comprising the hard disk substrate according to claim 1.

* * * * *